United States Patent

Dickens

[19]

[11] Patent Number: 5,806,063
[45] Date of Patent: Sep. 8, 1998

[54] DATE FORMATTING AND SORTING FOR DATES SPANNING THE TURN OF THE CENTURY

[75] Inventor: Bruce Dickens, Irvine, Calif.

[73] Assignee: McDonnell Douglas Corporation, Long Beach, Calif.

[21] Appl. No.: 725,574

[22] Filed: Oct. 3, 1996

[51] Int. Cl.$^6$ ..................................................... G06F 17/30
[52] U.S. Cl. .................. 707/6; 707/102; 707/7; 707/200
[58] Field of Search ................... 707/6, 102, 7, 707/200

[56] References Cited

U.S. PATENT DOCUMENTS

| | | | |
|---|---|---|---|
| 4,573,127 | 2/1986 | Korff | 364/493 |
| 5,630,118 | 5/1997 | Shaughnessy | 707/1 |
| 5,644,762 | 7/1997 | Soeder | 707/6 |
| 5,668,989 | 9/1997 | Mao | 707/101 |

OTHER PUBLICATIONS

The Year 2000 and 2–Digit Dates: A Guide for Planning and Implementation, Third Edition, May, 1996.
IBM: *The Year 2000 and 2–Digit Dates: A Guide for Planning and Implementation*; First Edition, Oct. 1995.

Primary Examiner—Wayne Amsbury
Attorney, Agent, or Firm—Bell Seltzer Intellectual Property Group of Alston & Bird LLP

[57] ABSTRACT

Dates stored in symbolic form in a database are reformatted to permit easy manipulation and sorting of date-related information. Each date in $M_1M_2$, $D_1D_2$, and $Y_1Y_2$ format is converted to $C_1C_2$, $Y_1Y_2$, $_{M1}M_2$, and $D_1D_2$ format. To accomplish the conversion, a 10-decade window starting on $Y_AY_B$ is defined that encompasses all dates in the database. The value of $C_1C_2$ is determined by the relative values of $Y_1Y_2$ and $Y_AY_B$. The reformatted date information is particularly useful when the reformatting is in $C_1C_2Y_1Y_2M_1M_2D_1D_2$ format, because sorting by date is accomplished using a pure numerical-value sort.

15 Claims, 1 Drawing Sheet

DATE FORMATTING AND SORTING FOR DATES SPANNING THE TURN OF THE CENTURY

BACKGROUND OF THE INVENTION

This invention relates to the manipulation of information in a database, and, in particular, to the determination of dates in a useful form.

Dates are stored as symbolic representations in computer databases in varying formats. For example, a date may be represented in the numerical representation MM/DD/YY, where MM is a two-digit month designator, DD is a two-digit day designator, and YY is a two-digit year designator (the last two digits of the year). Thus, Dec. 15, 1993 is designated as 12/15/93. A date may also be represented in an alphanumeric form MMM/DD/YY, where MMM is an alphabetic month designator (e.g., DEC for December), and DD and YY are the same as in the numerical form. Dec. 15, 1993 is represented in this format as DEC/15/93.

Such approaches for the representation of dates have worked well since the advent of computer databases, which has occurred in the twentieth century. Dates may be sorted in chronological order using the numerical representations. However, with the turn of the century at Jan. 1, 2000, the representation and utilization of dates becomes more complex. Using the numerical form above, Dec. 15, 2000 is represented as 12/15/00. If a numerical sort is performed on 12/15/93 and 12/15/00, the later date 12/15/00 sorts as the first-occurring date, an incorrect result.

Sets of dates spanning the turn of the century and associated with past, current, and future activities are now stored in many databases. When stored in the conventional formats discussed above, those dates will not readily be used and numerically sorted in chronological order. They may be manually converted to a more usable form in the sense that programs may be written to perform conversions, manipulations, and sorting. However, these programs typically require additional data fields for storage, which may be objectionable in some circumstances.

There is a need for an improved approach to the representation and utilization of dates in databases, and for converting the existing dates in databases to a more usable form. The present invention fulfills this need, and further provides related advantages.

SUMMARY OF THE INVENTION

The present invention provides an approach to the representation and utilization of dates stored symbolically in databases. Existing symbolic date representations are converted to a more useful form of symbolic date representations without the addition of new data fields, and in a manner that is performed automatically by the computer and requires no user input. The approach of the invention permits direct numerical sorting of dates.

In accordance with the invention, a method of processing dates stored in a database comprises the steps of providing a database with dates stored therein according to a format wherein $M_1M_2$ is the numerical month designator, $D_1D_2$ is the numerical day designator, and $Y_1Y_2$ is the numerical year designator, all of the dates falling within a 10-decade period of time. A 10-decade window with a $Y_AY_B$ value for the first year of the ten-decade window is selected, $Y_AY_B$ being no later than the earliest $Y_1Y_2$ year designator in the database. A century designator $C_1C_2$ is determined for each date in the database, $C_1C_2$ having a first value if $Y_1Y_2$ is less than $Y_AY_B$ and having a second value if $Y_1Y_2$ is equal to or greater than $Y_AY_B$. Each date in the database is formatted with the values $C_1C_2$, $Y_1Y_2$, $M_1M_2$, and $D_1D_2$.

In the case of most practical interest, the 10-decade period of time spans the year 2000 and begins with a year in which the second digit ($Y_B$ in $Y_AY_B$) is 0 (zero). For any 10-decade period including the year 2000, if the decade designator $Y_1$ of the date in the database is numerically less than the decade designator $Y_A$ of the first decade of the 10-decade period of time, the century designator $C_1C_2$ is "20". If $Y_1$ is equal to or greater than $Y_A$, $C_1C_2$ is "19". Dates in databases spanning more than 10 decades are not handled by this approach, but it is not expected that this limitation will be significant for most commercial and industrial databases.

This approach works particularly well if the dates are represented in the format $C_1C_2Y_1Y_2M_1M_2D_1D_2$. The date Dec. 15, 2000 is represented in this format as 20001215, for example. Dates represented in this format may be directly sorted numerically by fast sorting techniques, and thereafter stored back in the database.

The present invention thus provides an efficient approach to converting and utilizing symbolic date representations in databases, which allows automatic processing of dates ranging from before to after the year 2000. The large number of dates represented in some databases may thereby be readily processed and utilized. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
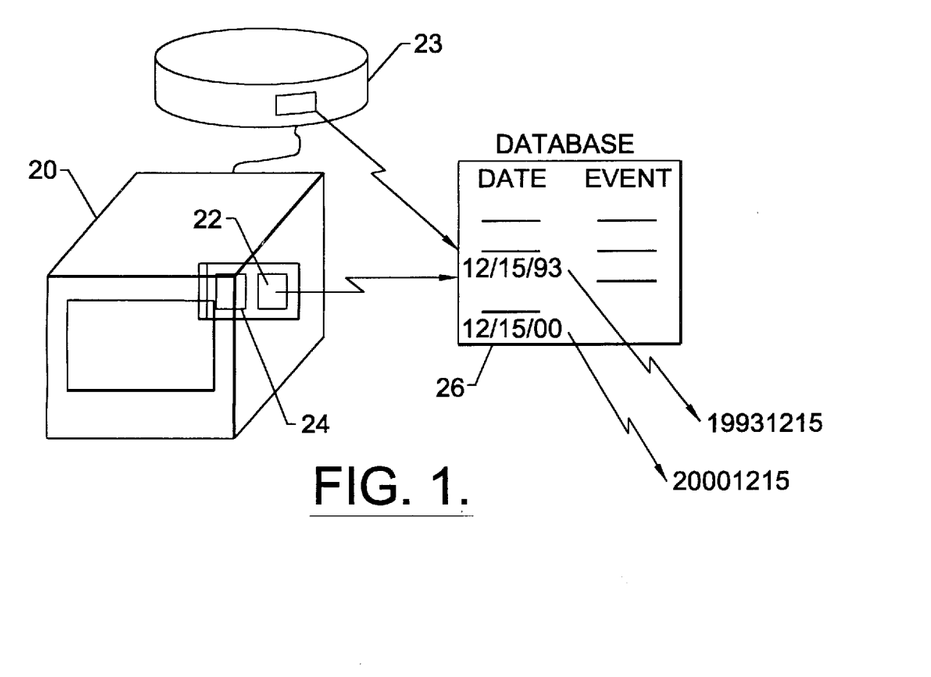
FIG. 1 is a schematic representation of a computer database with date information therein.

FIG. 1 schematically depicts a computer 20 having a read-only or random-access memory 22, a mass-storage device 23, and a central processing unit 24 therein. Stored in the memory 22 or on the mass-storage device 23 is a database 26. The database includes information in the form of symbolic representations of dates and associated information such as events occurring on the respective dates. In a conventional approach, the dates are stored in a format such as $M_1M_2/D_1D_2/Y_1Y_2$ format. M indicates month information, D day information, and Y year information, with the subscript 1 or 2 indicating the first or second digit of the designator, respectively. Dec. 15, 1993 is stored as 12/15/93 or 12-15-93, and Dec. 15, 2000 is stored as 12/15/00 or 12-15-00, for example. If a numerical sort is performed on these dates, 12/15/00 will sort chronologically prior to 12/15/93.

Figure 2:
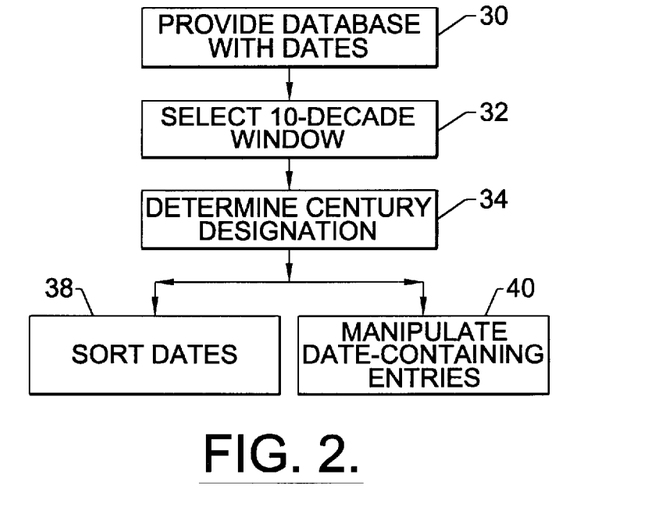
FIG. 2 is a block flow diagram of a preferred approach for practicing the approach of the invention.

FIG. 2 illustrates the approach of the invention. The computer database 26 is provided, numeral 30, having symbolic representations of dates stored therein. In some cases, the dates will be represented as discussed in the preceding paragraph. In other cases, an alphanumeric designator is used. In that approach, each date is stored as $M_aM_bM_c/D_1D_2/Y_1Y_2$ format, where $M_aM_bM_c$ is an alphabetical symbol such as JAN for January, FEB for February, etc. In that case, the month designator $M_aM_bM_c$ is first converted to the numerical form $M_1M_2$ by converting JAN to "01", FEB to "02", etc.

A 10-decade window is selected, numeral 32. That is, it is necessary that all dates in the database will be within some period of 10 decades, or 100 years. This limitation poses little problem for most industrial and commercial databases. The window may be arbitrarily selected. For example, the decade could begin with the 1950's and end with the 2040's, or it could begin with the 1980's and end with the 2070's. The 10-decade window will normally include some decades from the prior century and some from the new century.

The first year of the 10-decade window is represented by $Y_AY_B$. In a commonly utilized application, $Y_B$ is 0 (zero), although the invention is not limited to this case. That is, the 1950's first decade would be represented by $Y_A0$ of "50", and the 1980's first decade would be represented by $Y_A0$ of "80". For this case, a century designator $C_1C_2$ for a date is determined, numeral 34, by comparing the value of $Y_1$, the first digit of the year designator for the date, with $Y_A$, the first digit of the first decade of the 10-decade window. $C_1C_2$ is assigned a first value if $Y_1$ is less than $Y_A$ and a second value if $Y_1$ is equal to or greater than $Y_A$.

In the case of most interest, the 10-decade window includes decades earlier than the year 2000 and decades later than the year 2000, and $Y_B$ is zero $C_1C_2$ is assigned "20" if $Y_1$ is less than $Y_A$ and is assigned "19" if $Y_1$ is equal to or greater than $Y_A$. In that case and for example, if $Y_A$ is 5, meaning that the decade beginning in 1950 was selected as the first decade of the 10-decade window, and if $Y_1Y_2$ is "43", the century designator $C_1C_2$ is "20", indicating that the year in question in the database is 2043. On the other hand, if $Y_1Y_2$ is "63", the century designator $C_1C_2$ is "19", indicating that the year in question in the database is 1963. This selection process is performed in a completely automated fashion by the computer, without human input other than to select the starting date of the 10-decade window.

The symbolic representations of the dates in the database are reformatted with the values $C_1C_2$, $Y_1Y_2$, $M_1M_2$, and $D_1D_2$, numeral 36 of FIG. 2. In one case that produces particularly advantageous results for many operations, such as chronological date sorting, the date is represented in the form $C_1C_2Y_1Y_2M_1M_2D_1D_2$. For example, the date 12/15/93 (Dec. 15, 1993) is represented as 19931215 and the date 12/15/00 (Dec. 15, 2000) as 20001215. A straightforward numerical sort of date data fields expressed in this form produces an accurate chronological ordering.

Once the symbolic representations of the dates are reformatted according to the procedures set forth above, the date information may be sorted, numeral 38, or otherwise manipulated, numeral 40, together with the entries associated with the dates. Such manipulation may include handling of data associated with the dates, storing the dates and associated information back in the data base, or other processes.

The approach of the invention has been implemented in a computer program, a copy of which is attached as Exhibit A. This program converts dates both before and after the year 2000.

The present invention provides an effective technique for reformatting symbolic representations of date information that is rapid and automated, and yields new symbolic representations of date information that are particularly amenable to further processing. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of processing symbolic representations of dates stored in a database, comprising the steps of providing a database with symbolic representations of dates stored therein according to a format wherein $M_1M_2$ is the numerical month designator, $D_1D_2$ is the numerical day designator, and $Y_1Y_2$ is the numerical year designator, all of the symbolic representations of dates falling within a 10-decade period of time;

selecting a 10-decade window with a $Y_AY_B$ value for the first decade of the window, $Y_AY_B$ being no later than the earliest $Y_1Y_2$ year designator in the database;

determining a century designator $C_1C_2$ for each symbolic representation of a date in the database, $C_1C_2$ having a first value if $Y_1Y_2$ is less than $Y_AY_B$ and having a second value if $Y_1Y_2$ is equal to or greater than $Y_AY_B$; and reformatting the symbolic representation of the date with the values $C_1C_2$, $Y_1Y_2$, $M_1M_2$, and $D_1D_2$ to facilitate further processing of the dates.

2. The method of claim 1, wherein the 10-decade window includes the decade beginning in the year 2000.

3. The method of claim 2, wherein the step of determining includes the step of determining the first value as 20 and the second value as 19.

4. The method of claim 1, including an additional step, after the step of reformatting, of sorting the symbolic representations of dates.

5. The method of claim 1, wherein the step of reformatting includes the step of reformatting each symbolic representation of a date into the format $C_1C_2Y_1Y_2M_1M_2D_1D_2$.

6. The method of claim 5, including an additional step, after the step of reformatting, of sorting the symbolic representations of dates using a numerical-order sort.

7. The method of claim 1, wherein the step of providing a database includes the step of converting pre-existing date information having a different format into the format wherein $M_1M_2$ is the numerical month designator, $D_1D_2$ is the numerical day designator and $Y_1Y_2$ is the numerical year designator.

8. The method of claim 1, wherein the step of selecting includes the step of selecting $Y_AY_B$ such that $Y_B$ is 0 (zero).

9. The method of claim 1, including an additional step, after the step of reformatting, of storing the symbolic representation of dates and their associated information back into the database.

10. The method of claim 9, including the additional step, after the step of reformatting, of manipulating information in the database having the reformatted date information therein.

11. A method of processing dates in a database, comprising the steps of providing a database with dates stored therein according to a format wherein $M_1M_2$ is the numerical month designator, $D_1D_2$ is the numerical day designator, and $Y_1Y_2$ is the numerical year designator, all of dates falling within a 10-decade period of time which includes the decade beginning in the year 2000;

selecting a 10-decade window with a $Y_AY_B$ value for the first decade of the window, $Y_AY_B$ being no later than the earliest $Y_1Y_2$ year designator in the database;

determining a century designator $C_1C_2$ for each date in the database, $C_1C_2$ having a first value if $Y_1Y_2$ is less than $Y_AY_B$ and having a second value if $Y_1Y_2$ is equal to or greater than $Y_AY_B$;

reformatting each date in the form $C_1C_2Y_1Y_2M_1M_2D_1D_2$ to facilitate further processing of the dates; and sorting the dates in the form $C_1C_2Y_1Y_2M_1M_2D_1D_2$.

12. The method of claim 11, wherein the step of providing a database includes the step of converting pre-existing date information having a different format into the format wherein $M_1M_2$ is the numerical month designator, $D_1D_2$ is the numerical day designator and $Y_1Y_2$ is the numerical year designator.

13. The method of claim 11, wherein the step of selecting includes the step of selecting $Y_AY_B$ such that $Y_B$ is 0 (zero).

14. The method of claim 11, including an additional step, after the step of sorting, of storing the sorted dates and their associated information back into the database.

15. The method of claim 14, including the additional step, after the step of sorting, of manipulating information in the database having the reformatted date therein.

* * * * *

UNITED STATES PATENT AND TRADEMARK OFFICE
CERTIFICATE OF CORRECTION

PATENT NO. : 5,806,063
DATED : September 8, 1998
INVENTOR(S) : Dickens It is certified that error appears in the above-identified patent and that said Letters Patent is hereby corrected as shown below:

On title page, item [56],

In the References Cited, OTHER PUBLICATIONS, line 1, before "The", insert --IBM: --.

In the ABSTRACT, line 4, "$_{M1}M_2$" should read --$M_1M_2$--.

Signed and Sealed this

Twenty-ninth Day of December, 1998

*Attest:*

*Attesting Officer*

BRUCE LEHMAN

*Commissioner of Patents and Trademarks*

(12) EX PARTE REEXAMINATION CERTIFICATE (8056th)

United States Patent
Dickens (10) Number: US 5,806,063 C1
(45) Certificate Issued: Mar. 1, 2011

(54) DATE FORMATTING AND SORTING FOR DATES SPANNING THE TURN OF THE CENTURY

(75) Inventor: Bruce Dickens, Irvine, CA (US)

(73) Assignee: Dickens-Soeder 2000, Laguna Beach, CA (US)

Reexamination Request:
No. 90/005,592, Dec. 21, 1999
No. 90/005,628, Feb. 2, 2000
No. 90/005,727, May 16, 2000
No. 90/006,541, Feb. 7, 2003

Reexamination Certificate for:
Patent No.: 5,806,063
Issued: Sep. 8, 1998
Appl. No.: 08/725,574
Filed: Oct. 3, 1996

Certificate of Correction issued Dec. 29, 1998.

(51) Int. Cl.
*G06F 17/30* (2006.01)

(52) U.S. Cl. .................... 707/6; 707/102; 707/7; 707/200

(58) Field of Classification Search ............ 707/6, 707/102, 7, 200
See application file for complete search history.

(56) References Cited

U.S. PATENT DOCUMENTS

| | | |
|---|---|---|
| 3,936,966 A | 2/1976 | Zeiske |
| 4,193,255 A | 3/1980 | Ebihara et al. |
| 4,540,292 A | 9/1985 | Rubenstein et al. |
| 4,573,127 A | 2/1986 | Korff ............ 364/493 |
| 4,674,889 A | 6/1987 | Klaus |
| 4,696,003 A | 9/1987 | Kerr |
| 5,222,052 A | 6/1993 | Salame |
| 5,349,657 A | 9/1994 | Lee |
| 5,367,704 A | 11/1994 | Hasuo et al. |
| 5,438,574 A | 8/1995 | Taniguchi |
| 5,471,631 A | 11/1995 | Beardsley |
| 5,481,714 A | 1/1996 | Pipkin et al. |
| 5,511,164 A | 4/1996 | Brunmeier et al. |
| 5,513,306 A | 4/1996 | Mills |
| 5,513,351 A | 4/1996 | Grantz |
| 5,526,515 A | 6/1996 | Ross et al. |
| 5,600,836 A | 2/1997 | Alter |
| 5,630,118 A * | 5/1997 | Shaughnessy ......... 707/1 |
| 5,640,550 A | 6/1997 | Coker |
| 5,644,762 A | 7/1997 | Soeder |
| 5,668,989 A | 9/1997 | Mao |
| 5,680,622 A | 10/1997 | Even |
| 5,682,535 A | 10/1997 | Knudsen |
| 5,701,502 A | 12/1997 | Baker et al. |
| 5,719,826 A | 2/1998 | Lips |
| 5,737,735 A | 4/1998 | Soeder |
| 5,740,442 A | 4/1998 | Cox et al. |
| 5,742,818 A | 4/1998 | Shoroff |
| 5,758,336 A | 5/1998 | Brady |

(Continued)

OTHER PUBLICATIONS

Ohws, Computer Processing of dates outside the twentieth century, IBM Systems Journal, vol. 25, No. 2, 1986.*

Hewlett Packet, "Procedure Division in Nucleus," Sep. 1998.

Hewlett Packard, "Conversion Functions," Mar. 1987.

(Continued)

*Primary Examiner*—M. Steelman (57) ABSTRACT

Dates stored in symbolic form in a database are reformatted to permit easy manipulation and sorting of date-related information. Each date in $M_1M_2$, $D_1D_2$, and $Y_1Y_2$ format is converted to $C_1C_2$, $Y_1Y_2$, $_{M1}M_2$, and $D_1D_2$ format. To accomplish the conversion, a 10-decade window starting on $Y_AY_B$ is defined that encompasses all dates in the database. The value of $C_1C_2$ is determined by the relative values of $Y_1Y_2$ and $Y_AY_B$. The reformatted date information is particularly useful when the reformatting is in $C_1C_2Y_1Y_2M_1M_2D_1D_2$ format, because sorting by date is accomplished using a pure numerical-value sort.

U.S. PATENT DOCUMENTS

| | | |
|---|---|---|
| 5,758,346 A | 5/1998 | Baird |
| 5,761,668 A | 6/1998 | Adamchick |
| 5,765,145 A | 6/1998 | Masiello |
| 5,794,048 A | 8/1998 | Brady |
| 5,797,117 A | 8/1998 | Gregovich |
| 5,802,354 A | 9/1998 | Kubara et al. |
| 5,806,067 A | 9/1998 | Connor |
| 5,808,889 A | 9/1998 | Burgess |
| 5,809,500 A | 9/1998 | Nolan |
| 5,812,841 A | 9/1998 | Soeder |
| 5,812,849 A | 9/1998 | Nykiel et al. |
| 5,828,890 A | 10/1998 | Riehbock et al. |
| 5,835,909 A | 11/1998 | Alter |
| 5,838,979 A | 11/1998 | Hart et al. |
| 5,845,286 A | 12/1998 | Colizza |
| 5,878,422 A | 3/1999 | Roth et al. |
| 5,930,782 A | 7/1999 | Shaughnessy |
| 5,970,247 A | 10/1999 | Wolf |
| 5,987,253 A | 11/1999 | Brady et al. |
| 5,987,464 A | 11/1999 | Schneider |

OTHER PUBLICATIONS

IBM, "DFSORT—Application Programming Guide," Release 11.1, Feb. 1991.

IBM, "Programming Reference, Language Environment For MVS & VM," Sep. 1995.

Gillin, "A Y2K Pioneer Seeks (And Deserves) Recognition," Schoen, 1984.

Glass, Robert, "The Next Date Crisis and The Ones After That," Comm of the ACM, vol. 40, #1, Jan. 1997.

Matthews, "Excel 4 For Windows," p. 347, 1992.

Meyer, "Julian and Gregorian Calendars," Dr. Dobbs Journal, Mar. 1993.

"Date Adjustment at Turn of Century," IBM, May 1986.

"Here's One Alternative Date Method," Tick, Tick, Tick, vol. 1, No. 1, p. 1, 1993. (Article).

"One Man's Opinion," Tick, Tick, Tick, vol. 1, No. 1, p. 5, 1993 (Article).

Arnold, "Resolving Year 2000 Problems In Legacy Sotware," Software, Quality Week, Jun. 1, 1995. (Article).

Browe, Gary, "Intelligent Report Maintenance Using Dialogue Manager," Focus Systems Journal, pp. 70–78, Mar. 1990. (Journal).

Dejager, "Doomsday 2000," ComputerWorld, Sep. 6, 1993. (Article).

Furman, "Party When It's 1999," Software Magazine, p. 6, Apr. 1995. (Magazine).

Greer Timothy D., "Method of Sorting Dates and Times Allowing For Wrapping," IBM Technical Disclosure Bulletin, vol. 37, No. 8, Aug. 1994. (Bulletin).

Hart, et al., "A Scaleable, Automated Process for Year 2000 System Correction," PROC 18th International Conference on Software Engineering, pp. 475–484, Mar. 30, 1996. (Conference).

Hayes, "Waiting For 01–01–00," American Scientist, vol. 83, No. 1, Jan. 1995. (Article)

IBM, "Dynamic Calendar Manipullato," IBM Technical Disclosure Bulletin, vol. 37, No. 1, Jan. 1994. (Bulletin).

Lysgaard, "The Time Bomb," IFIP TC8 Conference on Governmental and Municipal Information Systems, pp. 513–519, 1987 (Conference).

Milam, Stan, "Extended Date Library for C," C/C++ Users Journal, vol. 12, No. 10, pp. 67–80, Oct. 1994. (Article).

Neuhas, "Databases," PC Magazine, vol. 9, No. 16, p. 471, Sep. 25, 1990. (Article).

Ohms, B.G., "Computer Processing of Dates Outside the Twentieth Century," IBM Systems Journal, vol. 25, No. 2, pp. 244–251, 1986. (Article).

Pieptea, D.R., "What Will The Change Of The Millennium Do To Our Data Processing," Management Information Systems Quarterly, vol. 10, No. 2, pp. 103–104, Jun. 1, 1986. (Article).

Roberts, "Dataserver 2000: Computer Software Prepares Legacy Systems For Year 2000," Enterprise Systems Journal, p. 10, Nov. 1994. (Article).

Schoen, "The Charmer Correction," Copyright Reg. TX 144–098, Dec. 1983.

Shaw, "Cap Gemnni Tackles The Year 2000," News 3x/400, pp. 30, Jun. 1995. (Article).

Smith, H.J., "What's Ahead For 2000 A.D.," APL Quote Quad, vol. 20, No. 4, p. 364, Jul. 1990. (Article).

Vandercook, "Now Is the Time," Systems Management, Mar. 1995. (Article).

Zenakis, "Preparing for 2000," Information Week, Feb. 26, 1990. (Article).

Sybase, Inc., *Commands Reference Manual For Sybase SQL, Server For Unix,* Release 4.9.1, Doc. ID 32270–01–0491–01, change 2, pp. 2–106, Oct. 1992. (Manual).

Oracle, *SQL Language Reference Manual,* Version 7.0, p. 4–49, May 1992. (Manual).

*MS–DOS Version 3.3 Manual,* 1987. (Manual).

Nantucket Corporation, *Clipper 5.0 Reference Manual,* pp. 4–112, 1984, 1985 and 1990. (Manual).

SAS Institute, Inc., *SAS Language: Reference,* Version 6, First Edition, pp. 63, 68, 85, 182, 536–39, 649–55, 670, 682–85, 690–95, 698–99, 704–6, 746, 790–91, 1991. (Book).

ANSI, *Information Technology—Programming Language—Common LISP,* ANSI X3.226–994, Sec. 25.1.4, 1994 (Book).

Oracle, *Oracle Developer/2000 Forms 4.5 Reference Manual,* vol. 2, part No. A32510–2, p. 5–91, 1994. (Manual).

ANSI, *MCITS/J13 Standard For Common LISP,* 1994.

Oracle Corporation, *SQL Language Reference Manual,* Version 7.0, part No. 778–70–1292, pp. 2–21, 2–27 to 2–31, 3–30 to 3–59, Dec. 1992 (Manual).

Sybase, Inc., *Sybase SQL Server Reference Manual,* Release 10.0 pp. 2/9–12, 2–15, 2/19–23, 3/34–38, Jun. 1994. (Manual).

IBM, *IBM SAA AD/Cycle Language Environment, PGMG Guide,* vol. 1, R. 3, Mar. 1994. (Guide).

David Moon, et al., *LISP Machine Manual,* Sixth Edition, MIT Artificial Intelligence Laboratory, p. 776, 1984. (Manual).

Duggan, Thomas, *Parallel Software Architecture,* Jan. 1994. (Book).

Duggan, Thomas, *Financial Product Technology System,* Sep. 1991. (Book).

Duggan, Thomas, *Array–Driven Parallel System Architecture,* 1996. (Book).

Gasteiger, D., *Make A Date With 1–2–3. . .,* Lotus, vol. 7, No. 4, p. 24, Mar. 1991. (Book).

Guy Steel, *Common LISP, The Language,* Digital Equipment Corp., 1984. (Book).

Guy Steel, *Common LISP, The Language,* Second Edition, p. 702, Digital Equipment Corp., 1990. (Book).
IBM, *The Year 2000 and 2–Digit Dates: A Guide for Planning and Implementation,* Third Edition, May 1996. (Guide).
IBM, *The Year 2000 and 2–Digit Dates: A Guide for Planning and Implementation,* First Edition, Oct. 1995. (Guide).
IBM, *The Year 2000 and 2–Digit Dates: A Guide for Planning and Implementation,* Ninth Edition, Feb. 1998. (Guide).
Murray, Jerome T. and Murray, Marilyn J., *The Year 2000 Computing Crisis,* McGraw–Hill, Mar. 1996. (Book).
Schinkel, Michael, *Programming In Clipper 5,* pp. 40, 100, 102, 337, 696, 672, Addison–Wesley, 1992. (Book).
Straley, Stephen J., *Programming In Clipper,* The Definitive Guide to the Clipper DBase Compiler, Second Edition, pp. 869–70 Addison–Wesley Publishing Company, Sep. 1988. (Guide).
Whitney, David E., "Year 2000," Share 84, Los Angeles, Feb. 26–Mar. 3, 1995. (CD–ROM/Symposium).
Whitney, David E., "Year 2000," Share 85, Los Angeles, Aug. 13–18, 1995. (CD–ROM/Symposium).
Japanese Published Application 05–027947 Translation, Feb. 5, 1993.
Japanese Published Application 05–027947, Feb. 5, 1993.
Knights, Roger, "Turn–of–the–Century Problem," CC#83118, Cobol Committee Working Paper, Aug. 23, 1983. (Document).
Knights, Roger, "Date–Handling Fnctions," CC#84051, Cobol Committee Working Paper, Aug. 23, 1983. (Document).
Knights, Roger, J4 Response To U.S. Public Review Comments on Cobol WD 1.4, pp. 46–48 of DO. J4/97–0318, Public Review Comments, Nov. 5, 1997.
"1995—Various Windowing Issues," pp. 1–6, www.year2000.com/promises/priorart/various.html, Jul. 27, 1995. (Internet posting).
"IBM White Paper," www.a390.ibm.com, 1995. (Internet posting).
"Mar. 27, 1995—Windowing—Expansion to CCYYM-MDD Via Windowing," Mar. 27, 1995. (Internet posting).
"May 12, 1995—Windowing—YYYYMMDD Code," May 12, 1995. (Internet posting).
"May 12, 1995—Windowing—YYYYMMDD as Inevitable," May 12, 1995. (Internet posting).
"May 12, 1995—Windowing—YYYYMMDD as Standard," May 12, 1995. (Internet posting).
"May 18, 1995—Windowing—Adding and Storing the Century," May 18, 1995. (Internet Posting).
"May 22, 1995—Windowing—More Discussion on Windowing," May 22, 1995. (Internet posting).
"Jun. 13, 1995—Windowing—Inevitability of 4 Digit Years," Jun. 13, 1995. (Internet posting).
"Jun. 13, 1995—Windowing—Inevitability of 4 Digit Years ESP. CCYYMMDD," Jun. 13, 1995. (Internet posting).
"Jun. 13, 1995—Windowing—Inevitability of 4 Digit Years ESP. CCYYMMDD & Storing IT!" Jun. 13, 1995. (Internet posting).
"Jun. 14, 1995—Windowing—Store as CCYYMMDD—Display as You Like!" Jun. 14, 1995. (Internet posting).
"Jun. 14, 1995—Windowing—Windowing Code in Use Already!" Jun. 14, 1995. (Internet posting).
"Jun. 15, 1995—Windowing—Windowing Code in Use Already!" Jun. 15, 1995. (Internet posting).

"Jun. 27, 1995—Windowing—35 Ways to Represent a Date. . . ," Jun. 27, 1995. (Internet posting).
"Jun. 29, 1995—Windowing—Date Expansion Discussing RE: IBM," Jun. 29, 1995. (Internet Posting).
"Jul. 3, 1995—Windowing—Windowing in Use," Jul. 3, 1995. (Internet posting).
"Jul. 10, 1995—Windowing—Macos System 7.1," Jul. 10, 1995. (Internet posting).
"Jul. 13, 1995—Windowing—Base Dates," (Internet posting).
"Jul. 13, 1995—Windowing & Expansion 7," Jul. 13, 1995. (Internet posting).
"1995—Windowing—EDI Standards," www.year2000.com/promises/priorartedi.html, p. 1, Jul. 16, 1995. (Internet posting).
"1995—Windowing—Expansion & Century Break," Jul. 24, 1995. (Internet posting).
"1995—Windowing—'Break Points' as Common," Jul. 28, 1995. (Internet posting).
"1995—Windowing—Expansion," www.year2000.com/promises/priorart/expansion2.html, Aug. 3, 1995. (Internet posting).
"1995—Windowing & Expansion 4," Aug. 5, 1995. (Internet posting).
"1995—Windowing & Expansion 5," www.year2000.com/promises/priorart/expansion5.html, Aug. 7, 1995. (Internet posting).
"1995—Windowing & Expansion 6," www.year2000.com/promises/priorart/expansion5.html, Aug. 7, 1995. (Internet posting).
"1995—Windowing—Inevitability of YYYYMMDD," Aug. 9, 1995. (Internet posting).
"1995—Windowing—Code Examples," Aug. 9, 1995. (Internet posting).
"1995—'Travelling' Window," Aug. 14, 1995. (Internet posting).
"1995—Windowing—Common Usage," Aug. 15, 1995. (Internet Posting).
"1995—Windowing—Application Examples," Aug. 26, 1995. (Internet posting).
"1995—Windowing—SSAA Using Expansion!" Sep. 21, 1995. (Internet posting).
"1995—Windowing as Magstripe Standards," Sep. 30, 1995. (Internet posting).
"1995—Windowing—YYYYMMDD as Standard," Oct. 1, 995. (Internet posting).
"1995—Windowing—YYYYMMDD as Standard 2," Oct. 5, 1995. (Internet posting).
"1995—Windowing—Date Expansion In Detail," Oct. 8, 1995. (Internet posting).
"1995—Windowing—Date Expansion 10," Oct. 18, 1995. (Internet posting).
ANSI X3,226–1994, Programming Language Common LISP, 1994 Section 25, 1.4.1.
Guy Steel, Common LISP, The Language, Second Edition, 1990, p. 702.
Commands Reference Manual for SQL Server, Release 4.9.1 Sybase Corporation, Oct. 1, 1992, Chapter 2, Section "Date Functions" p. 2–106.
Oracle Corporation, SQL Language Reference Manual, Version 7.0, May 1992, p. 4–49.
International Standard ISO 8601:1988(E), International Organization for Standardization, Jun. 16, 1998.

IBM: *The Year 2000 and 2–Digit Dates: A Guide for Planning and Implementation;* First Edition, Oct. 1995.

Process Sofware Corporation 1991 Manual, pp. 3–69 to 3–70.

Betts, Mitch, "Users Slow to Face Year 2000 Conversion," Computerworld, vol. 29, No. 15, Apr. 10, 1995, p. 73.

Arnold, N.R. "The end of the century is nearer than you think," Application Development Trends, Apr. 1995.

Bentley, Jon, "Programming pearls, confessions of a coder," Communications of ACM, Mar. 1986.

Butler, Ken, "Can Your Computer System Handle the Change of the Century?," Rough Notes, vol. 138, No. 9, Sep. 1995, pp. 28.

Cini, Al, "System Bug of the Apocalypse," Internetwork, Jan. 1995.

Coates, J. "Professional programmers face millennium–type disaster," Chicago Tribune, Feb. 26, 1995.

Cohn, Michael B., "No Need to Fear the Year 2000," Computerworld, vol. 28, No. 47, Nov. 21, 1994, p. 35.

Barker, Paul, "End of century problem looms as IS remains idle," Computing Canada, Nov. 8, 1994 pp. 1–4.

Cox, Brian, "Year 2000 is Problematic for Systems," National Underwriter (Life/health/Financial Services), vol. 98, No. 42, Oct. 17, 1994, pp. 7, 28.

Case, A., "System Date 2001, a Development Odyssey," Gartner Group, Application Development & Management Strategies (ADM), Research Note, Strategic Planning SPA–210–835, Feb. 8, 1993.

"Micro Focus Offers Year 2000 Fixer," Computerworld, Jul. 31, 1995, p. 8.

"Millennium 2000 impact," Council on Infofrmation Management, Mar. 1, 1995, link.

"For The Unwary, The New Millennium Could Bring Headaches," Newsbytes News Network. Seattle, WA. Mar. 30, 1995.

"Seec Upgrades Anaylsis & Maintenance," Software Magazine, Feb. 1995, p. 93.

"More on millennium metrics," IT Metrics Strategies, Apr. 1995, vol. 1. #3, pp. 11–14.

Calendars and calendar layout, Date formats, Formats for time–of–day, IBM SE09–8001–01, 1991, p. 3.2–3.

"Mainframe Time Bomb: Jan, 1, 2000," Fortune Magazine, Mar. 6, 1995, p. 24.

"Service for Year 2000 Year Date Processing of Programs Software," New Technology Japan, Feb. 1995, p. 24.

"Technology Problem Of The Century," Bank Technology News Faulkner & Gray, Inc., Jun. 1995, p. 10.

Xenakis, John, "The Fin de Siecle Comoputer virus," CFO Jul. 1995 p. 67.

Xenakis, John J, "The Year 2000 Surprise," CFO: The Magazine for Senior Financial Executives, vol. 11, No. 8, Aug. 1995, p. 22.

The Year 2000: A Critical Cost Containment Challenge, Harvard, Porter & Associates, Inc., Jul. 5, 1995, working paper.

"Year 2000: Keeping Doomsday Costs Down," Enterprise Data Center Strategies, Meta Group, Inc., File No. 431, Dec. 29, 1994.

"Troubled Time," Associated Press, Denver Post, (and various other USA newspapers), May 25, 1995.

"Viasoft helps organizations plan for revisions in year 2000," PC Week, Apr. 17, 1995, p. 23.

"Vendors Focus On Year 2000 Conversion Issue," Computerworld, Apr. 10, 1995, p. 73.

"SEEC Ship COBOL Tool Upgrade," PC Week, Nov. 21, 1994, p. 31.

"The glitch of the millennium," Communications Week, Jun 27, 1994.

"Users Invest in Millennium Changes," Xephon 1995, Insight IS, pp. 12–13.

"Viasoft's Unveil Code Decipher Software," Computerworld, Aug. 15, 1994, p. 16.

ANSI X3.51—1994 Information Systems—Representations of Universal Time, Local Time Differentials, and United States Time Zone References for Information Interchange.

Steward, Donals V., Software Engineering with System Analysis and Design, Brooks/Cole Publishing Company, 1987, IEEE Computer Society Press.

Roper, Ronald W. Larson, and Jeffrey S. Tiller, A Guidebook for Technology Assessment and Impact Analysis, North Holland, 1980.

"CAP Gemini Seeks To Solve Year 2000 Dilemma," News 3x/400, Jun. 1995, p. 30.

Taylor, Donald H. & Glezen, G. W., Auditing: Integrated Concepts and Procedures, John Wiley & Sons, New York, 1988.

"ANSI Cobol Standard Modified For The Year 2000," Information Week, Feb. 26, 1990, p. 19.

ANSI X3.30–1985 (R1991) Representation for Calendar Date and Ordinal Date for Information Interchange.

Yourdon, Edward, Modern Structured Analysis, Yourdon Press, Prentice Hall, 1989.

Ulrich, William, "Millennium date change: an apocalypse for IS?," Application Development Trends, Sep. 1994, pp. 21–22.

Adpac Unveil Date Conversion Tool, Computerworld, Oct. 10, 1994, p. 81.

Schick, K., "An RFP for the Year 2000 Date Change," Gartner Group, Applications Development and Management Strategies (ADM), Research Note, Tutorials, TU–215–1147, Apr. 12, 1995.

Schick, K., "INSPECT Legacy Applications for the Year 2000," Garter Group, Application Development & Management Strategies (ADM), Research Note, Strategic Planning SPA–215–1146, Apr. 12, 1995.

Schick, K. and C. Germann, "Date Change in the Year 2000: A Test of Asset Management," Gartner Group, Transition Strategies (TS), Research Note, Strategic Planning, SPA–LEG–162, Aug. 7, 1995.

Martin, James and Carma McClure, Structured Techniques The Basis for CASE, Revised Edition, Printice Hall, 1988.

Martin, James, Information Engineering, Book III Design and Construction, Prentice Hall, 1990.

Martin, James, Information Engineering, Book II Planning and Analysis, Printice Hall, 1990.

Runyan, Linda, "40 years on the frontier," Datamation, Mar. 15, 1991, pp. 34–8.

Schulmeyer, Gordon G., Zero Defect Software, McGraw–Hill, Inc., 1990.

Ross, Noah, "The End of the Century is Nearer Than You Think," Application Development Trends, Apr. 1995.

Sienko, N. "Countdown to 2000," Information Week, Sep. 24, 1990, p. 64, Final Word Column.

Schwartz, Susana, "Are Insurers Stuck in a Time Warp?," Insurance & technology, vol. 20, No. 5, May 1995, p. 56.

Schick, Kevin, "The Year 2000 Date Crisis," Government Finance Review, vol. 11, No. 4, Aug. 1995, pp. 32–33.

Schick, K., "Three Certainties: Death, Taxes and the Year 2000," Gartner Group, Application Development & Managament Strategies (ADM), Research Note, Strategic Planning SPA–215–1116, Jan. 25, 1995.

Schick, K. and C. Germann, "Date Change in the Year 2000: A Test of Asset Management," Gartner Group, Applications Development and Management Strategies (ADM), Research Note, Strategic Planning, SPA–605–228, Jul. 25, 1995.

Martin, Larry W., "Millennium Preparation," Software Magazine, vol. 13, No. 10, Jul. 1993, pp. 6–8.

McKendrick, Joseph, "A Once in a Century Crisis," Midrange Systems, vol. 8, No. 12, Jun. 30, 1995, pp. 17–18.

Martin, James and Joe Leben, Strategic Information Planning Methologies, Second Edition, Prectice Hall, 1989.

Perry, William E., A Structured Approach to Systems Testing, QED Technical Publishing Group, 1983.

McCarthy, Shawn P., "Hold the noisemakers: what system managers dread midnight Dec. 31, 1999," Givernment Computer News. Nov. 8, 1993, pp. 1–2.

Poland, Tom, "Year 2000 Dilemma Creating Hovoc with Software," National Underwriter (Life/Health/Financial Services), vol. 98, No. 49, Dec. 5, 1994, pp. 38–39.

Milmoe, A. "Year 2000 conversion costs," Meta Group, Sep. 1995.

Porter, Alan L., Frederic A. Rossini, Stanley R. Carpenter, A. T. Lysgaard, K. "The time bomb (dealing with the century in DP," Proceedings of the IFIP TC8 Conference on Governmental and Municipal Information Systems, North Holland, pp. 513–19, 1988.

Perry, William E., Quality Assurance for Information Systems: Methods Tools, and Techniques, QED Technical Publishing Group, 1991.

Phelps, John, "Year 2000—Known but Not Understood?," Gartner Group, Large Computer Research Note, Strategic Planning, SPA–800–1734, Jul. 26, 1995.

Lips, Michael, "Six–Digit Dates And The Century Change: Complex Problem. Simple Solution?," Enterprise System Journal, Oct. 1993, pp. 68–69.

Emigh, Jacqueline, "Averting appliction disaster for year 2000," Newsbytes, Jan. 6, 1995.

Hitchens, R. L., "Dating problems now? Wait' til year 2000," Computerworld, #25–4, 1991.

Henderson, Tom, "Crashing the party," Corporate Detroit, vol. 12, Sep. 1994, pp. 12–17.

Lips, Michael, "Year 2000 fixes," Computerworld, Apr. 24, 1995, p. 36.

Fine, Doug, "Companies Brace for Millennium," Infoworld, Apr. 10, 1995.

Glass, Brett, "Turn of the Century Will Bring Out Flaws in Many Programs," InfoWorld, vol. 17, No. 25, Jun. 19, 1995, p. 42.

Furman, Jeff and Albert Marotta, "Year 2000 Denial," Computerworld, vol. 28, No. 43, Oct. 24, 1994, pp. 70.

Greiner, Lynn, "Year 2000 a Time Bomb Ready to Explode," Computing Canada, vol. 21, No. 14, Jul. 5, 1995, p. 11.

Jones, David C., "Solving Year 2000 Problem Long, Costly Project," National Underwriter (Life/Health/Financial Services), vol. 99, No. 26, Jun. 26, 1995, pp. 9–24.

Falissard, T., "La grande peur de l'an 2000," Le Monde Informatique, Apr. 28, 1995, p. 62 (French language).

de Jager, Peter, "Feedback Highlights bad BIOS Blues," Information Canada, vol. 20, No. 2, Feb. 1995.

de Jager, Peter, "Collateral Damage Will Surface," Computer World Canada, vol. 12, No. 1, Jan. 19, 1995, p. 6.

de Jager, Peter, "2000 or Bust," CA Magazine, vol. 127, No. 6, Aug. 1994, pp. 32–33.

Eldridge, Andrew, "Warning warning warning: Millennium to bring massive computing failures," US Tech, Sep. 1995.

Dunn, Robert H., Software Defect Removal, McGraw–Hill, Inc., 1984.

de Jager, Peter, "Computer D–Day: Jan. 1, 2000," Toronto Star, Jun. 16, 1994.

Cox, Brian, "Year 2000 is A Big Problem for Systems," National Underwriter Property and Casualty, vol. 98, No. 47, Nov. 21, 1994, pp. 9, 18.

Cringley, Robert X., "Notes from the field," Infoworld, Apr. 24, 1995, p. 126.

Jeanne, F., "L'an 2000 arrive. Comment s'y preparer?," Le Monde Informatique, Apr. 28, 1995, p. 12 (French language).

Jones, David, "Solving the year 2000 problem: A long and costly project," National Underwriter, Life & Health Financial Services, Jun. 26, 1995, Vo. 99, Issue 26, p. 9.

Glass, Robert L., "The Date Wars: Learning Management by Issue," Information Systems Management, vol. 12, No. 2, Spring 1995, pp. 67–69.

Arnold, Robert S., "Millennium Now: Solutions for Century Date Change Impact," Appliction Development Trends, Jan. 1995, pp. 60–67.

Barker, Paul, "Study Shows Impact of Year 2000," Computing Canada, 94–47112, vol. 19, No. 26, Dec. 20, 1993, pp. 1–7.

Betts, Mitch, "Desktops Veer Toward Year 2000 Crisis," Computerworld, vol. 28, No. 28, Jul. 11, 1994, pp. 1–28.

Cornwell, Dwight, "It's the year 2000: Do you know where your date routines are?," Micro Focus Complications, Mar./Apr. 1995, pp. 6–7.

Elms, Teresa, "Global Trends Shape Midrange for 2000," System 3X/400, vol. 20, No. 12, Dec. 1992, pp. 44–50.

de Jager, Peter, "Start now or face 2000 Doom," Datamation 96–73255, vol. 41, No. 9, May 15, 1995, p. 92, 11.

de Jager, Peter, "If you start now . . . you just might make it," Computerworld, vol. 29, No. 47, Nov. 20, 1995, pp. 97–100.

de Jager, Peter, "Embrace the Future, let go of the Past," Information Canada, vol. 19, No. 12, Dec. 1994, pp. 5.

de Jager, Peter, "Do your Systems have only 5 years to live?," Best's Review (Life/Health), vol. 96, No. 2, May 1995, pp. 88–90.

de Jager, Peter, "Time's a wasting and The Clocks Keep on Tickin'," Info Canada, vol. 18, No. 5, May 1993, p. 7.

de Jager, Peter, "Only you can Decide," Information Canada, Jun. 1995.

Wolberg, John R., Conversion of Computer Software, Prentice–Hall, 1983, ISBN 0–13–172148–8.

"Countdown to systems crash," Newsweek, Apr. 24, 1995, p. 8.

Whitmore, Sam, "Clock is ticking to fix code before 2000 time bomb," PC Week, Nov. 7, 1994, p. 93.

Sullivan, R. Lee, "Ghost in the Machines," Forbes, Jun. 19, 1995.

Stitt, Martin, Debugging: Creative Techniques and Tools for Software Repair, John Wiley & Sons, Inc., 1992.

Posting on the Internet Web–Site of G. Aharonian, Internet Patent News Services on or about Dec. 29, 1999.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-14 and 15 are cancelled.

* * * * *